(12) United States Patent
Frosini et al.

(10) Patent No.: US 8,430,653 B2
(45) Date of Patent: Apr. 30, 2013

(54) MOTOR COMPRESSOR

(75) Inventors: Franco Frosini, Florence (IT); Massimo Camatti, Pistoia (IT); Eugenio Rossi, Lucca (IT); Guiseppe Vannini, Pistoia (IT); Sabrina Tasselli, Prato (IT)

(73) Assignee: Nuovo Pignone, S.p.A., Florence (IT)

( * ) Notice: Subject to any disclaimer, the term of this patent is extended or adjusted under 35 U.S.C. 154(b) by 144 days.

(21) Appl. No.: 11/674,464

(22) Filed: Feb. 13, 2007

(65) Prior Publication Data

US 2007/0196215 A1 Aug. 23, 2007

(30) Foreign Application Priority Data

Feb. 17, 2006 (IT) ............... MI2006A0294

(51) Int. Cl.
*F04B 35/04* (2006.01)
*H02K 7/09* (2006.01)

(52) U.S. Cl.
USPC .............. 417/423.3; 417/423.12; 417/423.14; 310/90.5

(58) Field of Classification Search .................. 417/120, 417/140, 423.8, 366, 367, 368, 369, 370, 417/371, 372, 373; 310/52, 55, 57, 58, 60 R, 310/90.5
See application file for complete search history.

(56) References Cited

U.S. PATENT DOCUMENTS

| 4,969,803 | A | * | 11/1990 | Turanskyj | 417/247 |
|---|---|---|---|---|---|
| 5,355,042 | A | * | 10/1994 | Lewis et al. | 310/90.5 |
| 5,714,818 | A | * | 2/1998 | Eakman et al. | 310/90.5 |
| 6,043,580 | A | * | 3/2000 | Vogel et al. | 310/179 |
| 6,164,084 | A | * | 12/2000 | Watson et al. | 62/402 |
| 6,390,789 | B1 | * | 5/2002 | Grob et al. | 417/350 |
| 6,450,781 | B1 | * | 9/2002 | Petrovich et al. | 417/350 |
| 6,464,469 | B1 | * | 10/2002 | Grob et al. | 417/251 |
| 6,685,447 | B2 | * | 2/2004 | Mabe et al. | 417/423.8 |
| 6,700,237 | B1 | * | 3/2004 | Yang | 310/58 |
| 6,900,553 | B2 | * | 5/2005 | Gozdawa | 290/52 |
| 7,144,226 | B2 | * | 12/2006 | Pugnet et al. | 417/244 |
| 7,156,627 | B2 | * | 1/2007 | Lenderink et al. | 417/423.8 |
| 2002/0037772 | A1 | * | 3/2002 | Fisch et al. | 464/182 |
| 2004/0170505 | A1 | * | 9/2004 | Lenderink et al. | 417/244 |
| 2004/0179961 | A1 | * | 9/2004 | Pugnet et al. | 417/423.5 |
| 2005/0089392 | A1 | * | 4/2005 | Lubell et al. | 415/104 |
| 2005/0189772 | A1 | * | 9/2005 | Gozdawa | 290/52 |
| 2005/0189827 | A1 | * | 9/2005 | Gozdawa | 310/58 |

FOREIGN PATENT DOCUMENTS

| EP | 0301285 A1 | 2/1989 |
|---|---|---|
| EP | 1564379 A2 | 8/2005 |

(Continued)

OTHER PUBLICATIONS

Office Action for Related Chinese Patent Application No. 200710087982.2 dated Feb. 25, 2010.

(Continued)

*Primary Examiner* — Charles G Freay
*Assistant Examiner* — Alexander Comley
(74) *Attorney, Agent, or Firm* — Potomac Patent Group PLLC

(57) ABSTRACT

A motor-compressor includes a compressor, an electric motor directly connected to the compressor, magnetic bearings and one gas support located adjacent to a magnetic bearing to seal and support an end of the compressor's rotor. The compressor and the electric motor are integrated in a single unit, being housed in a single box or casing.

19 Claims, 1 Drawing Sheet

FOREIGN PATENT DOCUMENTS

| | | | |
|---|---|---|---|
| JP | 59208124 | A | 11/1984 |
| JP | 64029693 | A | 1/1989 |
| JP | 64080799 | A | 3/1989 |
| JP | 2000002469 | A | 1/2000 |
| JP | 2001041199 | A | 2/2001 |
| WO | 2005003512 | A1 | 1/2005 |

OTHER PUBLICATIONS

European Search Report for Application No. 07102451.7 dated Aug. 4, 2010.
JP Office Action dated Sep. 11, 2012 from corresponding JP Application No. 2007-034488.

* cited by examiner

MOTOR COMPRESSOR

FIELD OF THE INVENTION

The present invention relates to a motor-compressor used for the compression of process gas, in particular used for applications in which a reduced maintenance and high reliability are required, and more specifically used in applications in underwater environments.

BACKGROUND OF THE INVENTION

A motor-compressor normally comprises a compressor of process gas and an electric motor for activating said compressor.

These are typically coupled with each other by means of a joint, which connects a portion of a shaft of the compressor, extending from its box or casing, to a corresponding portion of a rotor of an electric motor, which in turn extends from the box or casing of the same electric motor.

Both the motor and the compressor are equipped with at least a pair of radial bearings for supporting the corresponding rotor.

In certain cases, these bearings are lubricated with oil: this has the disadvantage of the use of control and management systems of the lubricating oil with consequent high encumbrances and significant maintenance interventions.

In the case of submarine applications this type of configuration (non-integrated) requires a series of sealing washers to insulate the internal parts of the compressor and electric motor, and above all the parts of the respective shafts extending therefrom for coupling.

This however consequently increases the number of components and complexity of the motor-compressor.

BRIEF DESCRIPTION OF THE INVENTION

An objective of the present invention is to provide a motor-compressor which is reliable with time and has reduced maintenance times and costs.

Another objective is to provide a motor-compressor which has a reduced number of components to increase the reliability and availability.

A further objective is to avail of a motor-compressor which is compact, light and easily transportable.

Yet another objective is to provide a motor-compressor which is simple and economical.

These objectives according to the present invention are achieved by providing a motor-compressor as specified in claim 1.

Further characteristics of the invention are indicated in the subsequent claims.

The characteristics and advantages of a motor-compressor according to the present invention will appear more evident from the following illustrative and non-limiting description referring to the enclosed schematic drawings, in which:

DETAILED DESCRIPTION OF THE INVENTION

Figure 1:
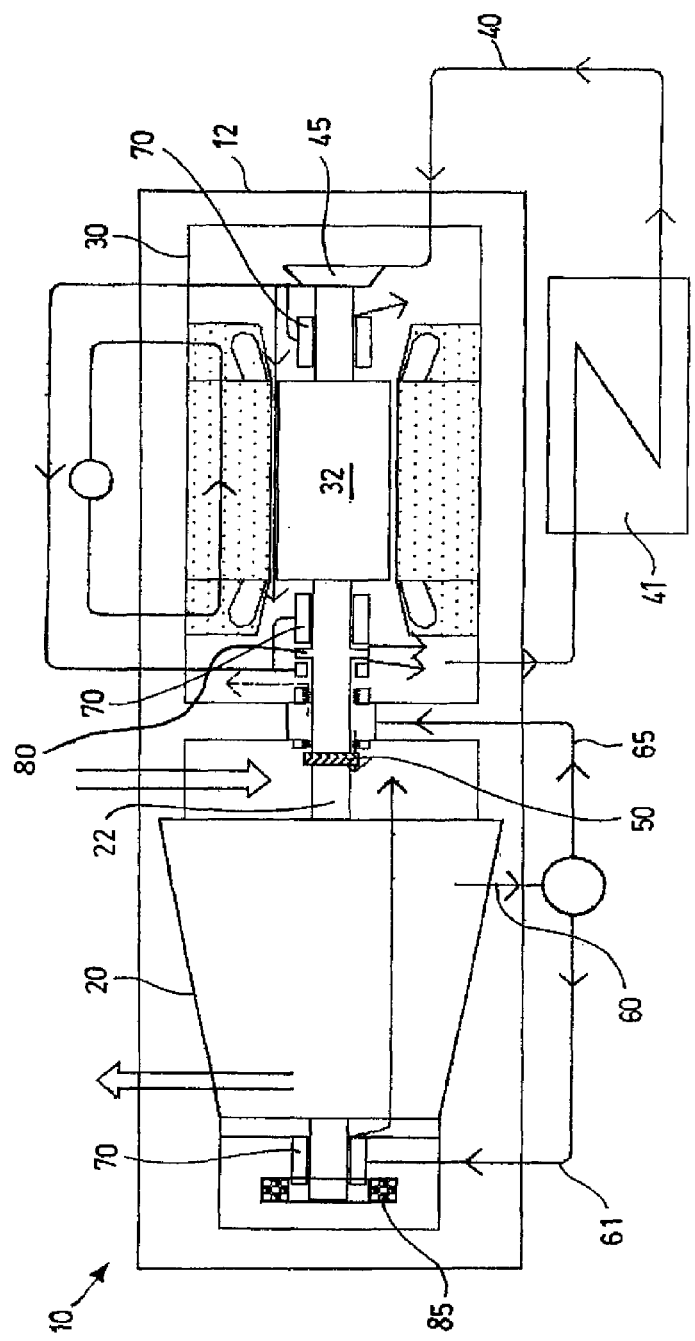
FIG. 1 is a partially sectional raised side schematic view of a preferred embodiment of a motor-compressor according to the present invention.

With reference to the figures, these show a motor-compressor 10 comprising a compressor 20 and an electric motor 30 directly connected to said compressor 20, which are integrated in a single unit.

In particular, said motor-compressor 10 comprises a single box or casing 12 in which said compressor 20 and said electric motor 30 are housed.

Said compressor 20 and said electric motor 30 are preferably not separated and the same type of gas (process gas processed by the compressor) pass through both.

Although process gas contains potentially corrosive/erosive agents, capable of degrading the electric parts in an extremely rapid time, (in particular the motor 30 coils and magnetic bearings 70 of the rotor), the motor-compressor 10 according to the present invention comprises a protection system of the motor windings and magnetic bearings from the process gas based on the use of barriers.

Said motor-compressor 10 preferably comprises three active radial magnetic bearings 70 for supporting both a rotor 32 of the electric motor 30 and a rotor 22 of the compressor 20.

A first and a second bearing of said three active magnetic bearings 70 are preferably positioned and support said shaft 32 of said electric motor 30 close to its ends.

A third bearing of said three active magnetic bearings 70 preferably supports and is positioned on a free end of said rotor 22 of said compressor 20. In this way, the necessity of lubricating oil and relative maintenance interventions is advantageously avoided, at the same time reducing the number of bearings for supporting the electric motor 30 and compressor 20 to the minimum possible, as three supporting bearings 70 are used.

According to the invention, it is in fact superfluous to resort to a configuration of the traditional type with four transporting bearings 70.

Even if, on the other hand, the solution according to the invention enables resort to be made to a configuration in which only two radial bearings are used, it has been verified that in particularly difficult application contexts, such as for example in submarine applications, where the maximum reliability of the system is required and where the functioning scenarios require a high number of centrifugal disc wheels, the solution with two bearings does not guarantee the necessary reliability.

Said motor-compressor 10 preferably comprises a further active magnetic bearing 80 suitable for supporting axial thrusts, in particular situated on said rotor 32 of said electric motor 30.

In addition to the three active radial magnetic bearings 70, the rotor is provided with a fourth gas support 85 situated close to the bearing of the compressor.

This support is capable of increasing the stability of the rotor and substituting the magnetic bearing in the case of its malfunctioning.

In particular, said motor-compressor 10 comprises a suitable direct coupling 50 with a front toothing (Hirth type), which connects said compressor 20 to said electric motor 30.

In particular, said direct coupling 50 connects and makes integral said rotor of said compressor 20 and said rotor 32 of said electric motor 30.

In other words, an end portion of said rotor 32 of said electric motor 30 is connected by means of a front coupling 50 with a corresponding end portion 22 of said rotor of said compressor 20.

Said direct coupling 50 connects in particular said rotor 32 of said electric motor 30 to said rotor 22 of said compressor 20 by means of a tie-rod, not shown, fixed to said rotor 32 of said electric motor 30 and passing through said rotor 22 of said compressor 20.

Said tie-rod is assembled by acting on the accessible side of said centrifugal compressor 20 and this avoids other openings in the side surface of the outer casing excluding those for the passage of service/process fluids and wires for the electrical connection, as on the contrary is necessary according to the known art, wherein the connection between the motor shaft and compressor shaft requires an access opening through the casing.

Said casing 12 consequently does not have any connections in the connection point between the motor and compressor but, on the side surface, comprises a series of openings exclusively suitable for the passage of service/process fluids and for the passage of wires for the electrical connection: this aspect is particularly advantageous in applications in which a reduction in possible leakages between the inner environment of the machine and the outside environment is of great importance (especially submarine applications).

Figure 2:
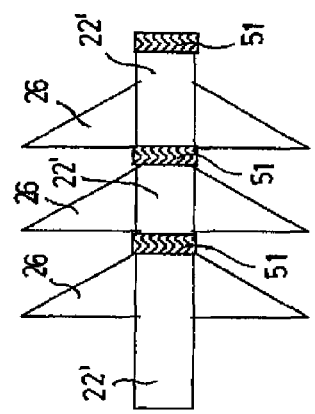
FIG. 2 is a schematic view of an internal detail of the compressor.

With reference to FIG. 2, according to a preferred embodiment of the present invention, said rotor 22 of said compressor 20 comprises a series of portions 22' and a series of direct couplings 51 with a front toothing, of the Hirth type, to make said portions 22' integral with each other.

Each portion 22' is equipped with a respective disc wheel 26 and is also suitable for being coupled with at least another portion 22' by means of a respective analogous direct coupling 51 with a front toothing.

The number of disc wheels is preferably adapted to the particular compression service requirements.

The presence of a series of sections 22' also allows the following advantages: the diaphragms which enclose the disc wheels 26 can be produced in a single piece; internal washer seals can be avoided.

In this way, the probability of internal leakages is reduced to the minimum.

Said rotor 22 of said compressor 20 can be completely assembled to the stator parts (diaphragms) on the outside of the casing 12 thus facilitating assembly operations.

Finally, each disc wheel 26 situated in each portion 22' is produced integrally with the shaft.

The cooling of the electric parts is preferably effected as follows.

For the electric motor 30 there is a closed circuit 40 equipped with an external exchanger 41 and disc wheel 45 situated at the end of the rotor 32 of said electric motor 30, to circulate the cooling gas through the stator and rotor parts. The gas used is the same process gas which is inserted in the motor volume in the ignition phase.

The magnetic bearings of the motor side are cooled by the same gas which is circulating in the motor, by means of the system 40 and the disc wheel 45.

For the magnetic bearing of the compressor side, the cooling is guaranteed by means of a gas discharge 60 from the first compressor phase sent to the magnetic bearing through a channeling 61. The same discharge, by exploiting a different channeling 65, also reaches the motor, where it effects a compensation (part of the gas flows from the motor chamber to the compressor chamber).

The configuration of said motor-compressor 10 can be either horizontal or vertical depending on the particular installation demands.

As it is more compact, the motor-compressor is advantageously easy to transport.

It can therefore be seen that a motor-compressor according to the present invention achieves the objectives indicated above.

The motor-compressor of the present invention thus conceived can undergo numerous modifications and variants, all included in the same inventive concept.

Furthermore, in practice, the materials used as also the dimensions and components, can vary according to technical requirements.

What is claimed is:

1. A motor-compressor comprising:
a compressor having a rotor, the rotor having first and second ends;
an electric motor connected to said compressor, the electric motor having a rotor having third and fourth ends;
a direct coupling provided between the compressor and the electric motor and configured to connect the second end of the rotor of the compressor to the third end of the rotor of the electric motor, wherein the direct coupling includes a front coupling and a tie rod to join the rotor of the compressor to the rotor of the electric motor;
first, second and third active magnetic bearings configured to support the rotor of the electric motor and the rotor of the compressor, the first active magnetic bearing being configured to support the first end of the rotor of the compressor, the second end of the rotor of the compressor being free of active magnetic bearings, the second active magnetic bearing being configured to support the third end of the rotor of the electric motor and the third active magnetic bearing being configured to support the fourth end of the rotor of the electric motor; and
a single gas support element located adjacent to the first magnetic bearing to seal and support the first end of the rotor of the compressor,
wherein said compressor and said electric motor are integrated in a single unit and are housed in a single box or casing, and only the first second and third active magnetic bearings and the single gas support element provide radial support to the rotor of the electric motor and the rotor of the compressor inside the single box or casing.

2. The motor-compressor according to claim 1, wherein the first, second and third active magnetic bearings are radial magnetic bearings.

3. The motor-compressor according to claim 1, wherein the first magnetic bearing is on one side of the direct coupling and the second and third magnetic bearings are on another side of the direct coupling.

4. The motor-compressor according to claim 1, wherein the direct coupling includes a front toothing which connects and makes integral the rotor of said compressor and the rotor of said electric motor.

5. The motor-compressor according to claim 1, wherein the rotor of said compressor is subdivided into a series of portions, made integral with each other by means of a series of direct couplings having a front toothing.

6. The motor-compressor according to claim 5, wherein each portion of the rotor of the compressor is provided with a respective disc wheel integral with a shaft of the rotor and is configured to be coupled with at least another portion of the rotor by a respective direct coupling with a front toothing.

7. The motor-compressor according to claim 1, further comprising an active magnetic bearing provided on a shaft of the electric motor and configured to support axial thrusts.

8. The motor-compressor according to claim 1, wherein said casing comprises, on a side surface, a series of openings exclusively suitable for the passage of service/process fluids and for the passage of wires for an electrical connection.

9. The motor-compressor according to claim 1, wherein the compressor and the electrical motor are disposed either horizontal or vertical.

10. A motor-compressor comprising:
a compressor having a compressor shaft configured to rotate around an axis;
an electric motor connected to the compressor and having a motor shaft configured to rotate around said axis;
a front coupling configured to connect an end of the compressor shaft to an end of the motor shaft such that the motor shaft rotates the compressor shaft;
plural radial magnetic bearings provided at ends of the compressor shaft and the motor shaft and configured to support the compressor and motor shafts;
a single gas support element located adjacent to one of the plural radial magnetic bearings to seal and support an end of the compressor shaft;
a closed cooling circuit connected to the electrical motor but not to the compressor, the closed cooling circuit including a cooling disc wheel located on the motor shaft and configured to circulate a cooling gas; and
a casing including the compressor, the electric motor, the front coupling, the plural radial magnetic bearings, the single gas support element, and the closed cooling circuit and configured to seal an inside of the casing,
wherein another end of the compressor shaft coupled to the motor shaft is free of radial magnetic bearings, and only the plural radial magnetic bearings and the single gas support element provide radial support to the compressor shaft and the motor shaft inside the casing.

11. The motor-compressor according to claim 10, wherein the end of the compressor shaft coupled to the motor shaft is free of any bearing.

12. The motor-compressor according to claim 10, wherein a gas compressed by the compressor is provided to an enclosure of the electric motor.

13. The motor-compressor according to claim 10, wherein the compressor shaft is divided into a series of portions, each made integral with other portions of the compressor shaft by a series of direct couplings having a front toothing.

14. The motor-compressor according to claim 13, wherein each portion of the compressor shaft is provided with a respective disc wheel integral with the compressor shaft and each portion is configured to be coupled with at least another portion of the compressor shaft by a respective coupling with a front toothing.

15. The motor-compressor according to claim 10, further comprising an active magnetic bearing provided on the motor shaft and configured to support axial thrusts.

16. The motor-compressor according to claim 10, wherein the plural radial magnetic bearings are only three radial magnetic bearings.

17. The motor-compressor according to claim 1, further comprising:
a closed cooling circuit connected to the electrical motor but not to the compressor, the closed cooling circuit including a cooling disc wheel located on the shaft of the electrical motor and configured to circulate a cooling gas.

18. The motor-compressor according to claim 10, wherein the front coupling includes a Hirth coupling and a tie rod to join the compressor rotor to the motor rotor.

19. A motor-compressor comprising:
a compressor having a rotor, the rotor having first and second ends;
an electric motor connected to said compressor, the electric motor having a rotor having third and fourth ends;
a direct coupling provided between the compressor and the electric motor and configured to connect the second end of the rotor of the compressor to the third end of the rotor of the electric motor, wherein the direct coupling includes a Hirth coupling and a tie rod to join the rotor of the compressor to the rotor of the electric motor;
first, second and third active magnetic bearings configured to support the rotor of the electric motor and the rotor of the compressor, the first active magnetic bearing being configured to support the first end of the rotor of the compressor, the second end of the rotor of the compressor being free of active magnetic bearings, the second active magnetic bearing being configured to support the third end of the rotor of the electric motor and the third active magnetic bearing being configured to support the fourth end of the rotor of the electric motor; and
a single gas support element located adjacent to the first magnetic bearing to seal and support the first end of the rotor of the compressor,
wherein said compressor and said electric motor are integrated in a single unit and are housed in a single box or casing, and the motor compressor includes no other gas support element supporting the rotor of the compressor and the rotor of the motor.

* * * * *